United States Patent
Alonzo, III et al.

(10) Patent No.: US 11,735,023 B1
(45) Date of Patent: *Aug. 22, 2023

(54) DISASTER DETECTION SYSTEM

(71) Applicant: UIPCO, LLC, San Antonio, TX (US)

(72) Inventors: Edward Manuel Alonzo, III, San Antonio, TX (US); James A. Wheeler, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 327 days.

This patent is subject to a terminal disclaimer.

(21) Appl. No.: 17/107,675

(22) Filed: Nov. 30, 2020

Related U.S. Application Data

(63) Continuation of application No. 16/453,892, filed on Jun. 26, 2019, now Pat. No. 10,930,132.

(60) Provisional application No. 62/753,374, filed on Oct. 31, 2018.

(51) Int. Cl.
| | |
|---|---|
| *G08B 1/08* | (2006.01) |
| *G08B 21/10* | (2006.01) |
| *G08B 5/38* | (2006.01) |
| *H04W 4/90* | (2018.01) |
| *G06Q 50/26* | (2012.01) |
| *G05B 15/02* | (2006.01) |
| *G08B 7/06* | (2006.01) |
| *G08B 3/10* | (2006.01) |
| *H04W 4/021* | (2018.01) |
| *G06Q 30/0601* | (2023.01) |

(52) U.S. Cl.
CPC ............ *G08B 21/10* (2013.01); *G05B 15/02* (2013.01); *G06Q 50/265* (2013.01); *G08B 3/10* (2013.01); *G08B 5/38* (2013.01); *G08B 7/066* (2013.01); *H04W 4/021* (2013.01); *H04W 4/90* (2018.02); *G06Q 30/0633* (2013.01)

(58) Field of Classification Search
CPC . G08B 21/10; G08B 3/10; G08B 5/38; G08B 7/066; G05B 15/02; G06Q 50/265; G06Q 30/0633; H04W 4/021; H04W 4/90
USPC .... 340/539.13, 539.11, 539.26, 539.28, 905; 116/69; 455/404.1, 466
See application file for complete search history.

(56) References Cited

U.S. PATENT DOCUMENTS

| | | | |
|---|---|---|---|
| 9,509,424 B2 | 11/2016 | Sasaki et al. | |
| 10,930,125 B1 | 2/2021 | Alonzo, III | |
| 10,930,132 B1 * | 2/2021 | Alonzo, III | ............ G05B 15/02 |

(Continued)

OTHER PUBLICATIONS

Office Action dated Apr. 29, 2020 in U.S. Appl. No. 16/453,923.

(Continued)

*Primary Examiner* — Anh V La
(74) *Attorney, Agent, or Firm* — Plumsea Law Group, LLC

(57) ABSTRACT

A disaster detection system includes a device processor; and a non-transitory computer readable medium including instructions executable by the device processor to perform the following steps: receiving data from a plurality of geographically distributed personal electronic devices; determining, based on the data received from the personal electronic devices, that a disaster has occurred; and sending one or more commands pertaining to the disaster to one or more third parties. The one or more commands pertaining to the disaster may include one or more alerts to one or more organizations that provide support for disasters.

20 Claims, 13 Drawing Sheets

(56) References Cited

U.S. PATENT DOCUMENTS

| | | |
|---|---|---|
| 2002/0138298 A1 | 9/2002 | Ichikawa et al. |
| 2008/0088434 A1* | 4/2008 | Frieder et al. |
| 2008/0126417 A1* | 5/2008 | Mazurik ................. G06F 16/80 |
| 2010/0325473 A1 | 12/2010 | Agneeswaran et al. |
| 2011/0130636 A1 | 6/2011 | Daniel et al. |
| 2011/0169633 A1 | 7/2011 | Lauder |
| 2012/0063270 A1 | 3/2012 | Angell |
| 2013/0036175 A1 | 2/2013 | Lau |
| 2013/0204452 A1* | 8/2013 | Yamaguchi .............. H02H 3/02 700/292 |
| 2014/0188394 A1* | 7/2014 | Febonio .................. G06F 30/13 702/15 |
| 2015/0111524 A1 | 4/2015 | South |
| 2015/0241582 A1 | 8/2015 | Kahn et al. |
| 2016/0119424 A1 | 4/2016 | Kane et al. |
| 2016/0157032 A1 | 6/2016 | Kane |
| 2017/0311131 A1 | 10/2017 | South |
| 2017/0036967 A1 | 11/2017 | Grothe et al. |
| 2017/0358196 A1 | 12/2017 | Jang |
| 2018/0053394 A1 | 2/2018 | Gersten |
| 2018/0293867 A1 | 10/2018 | Yang |
| 2018/0364375 A1 | 12/2018 | Naughton |
| 2019/0342739 A1* | 11/2019 | Shah .................. G01C 21/3461 |

OTHER PUBLICATIONS

Office Action dated Aug. 4, 2020 in U.S. Appl. No. 16/453,892.
Office Action dated Mar. 31, 2020 in U.S. Appl. No. 16/453,892.
Office Action dated Sep. 16, 2022 in U.S. Appl. No. 17/154,205.

* cited by examiner

DISASTER DETECTION SYSTEM

CROSS-REFERENCE TO RELATED APPLICATIONS

This application is a continuation of Alonzo III et al., U.S. patent application Ser. No. 16/453,892, filed Jun. 26, 2019, and entitled "Disaster Detection System," which claims priority to provisional patent application No. 62/753,374, filed on Oct. 31, 2018. The entire disclosures of these applications are hereby incorporated by reference.

TECHNICAL FIELD

The present disclosure generally relates to the detection of events using sensors in personal electronic devices and, more particularly, collectively utilizing data collected from a plurality of distributed personal electronic devices to determine the occurrence of events and providing a response to the determination that such events have occurred.

BACKGROUND

There are programs for detecting natural disasters, such as earthquakes. These programs include stationary seismic monitoring systems. They are not interactive with individuals in terms of providing information and assistance tailored to individuals or groups of individuals affected by such natural disasters. The information of where and when earthquakes occur is available, but it is not readily provided to the public with any particular context or guidance as to what those in the public who are affected by the disasters should do to best endure the event.

There are also systems that have been developed to detect criminal activity, such as an active shooter in a civilian locality. Such systems may include sensors deployed on official vehicles, such as police helicopters. However, the information collected and determined by such systems is not readily provided to the public.

There is a need in the art for a system and method that addresses the shortcomings discussed above. In particular, there is a need in the art for disaster and crime detection systems that are more readily accessible to and interactive with the public.

SUMMARY

The present disclosure is directed to a system and methods for detecting events. The disclosed system may collect data from personal electronic devices, such as mobile phones, to detect the occurrence of natural disasters and/or criminal activity. Upon a determination that a natural disaster or criminal act has occurred, the system may send information, instructions, commands, or other communications to the personal electronic devices affected by the events, including the personal electronic devices from which the data was collected. The system may also send commands to third parties. Also, in some embodiments, the system may send commands to affect the operation of one or more control systems proximate to the location of the detected event.

In one aspect, the present disclosure is directed to a disaster detection system. The system may include a device processor; and a non-transitory computer readable medium including instructions executable by the device processor to perform the following steps: receiving data from a plurality of geographically distributed personal electronic devices; determining, based on the data received from the personal electronic devices, that a disaster has occurred; and sending information pertaining to the disaster to one or more of the personal electronic devices.

In another aspect, the present disclosure is directed to a disaster detection system, comprising: a device processor; and a non-transitory computer readable medium including instructions executable by the device processor to perform the following steps: receiving data from a plurality of geographically distributed personal electronic devices; determining, based on the data received from the personal electronic devices, that a natural disaster has occurred; and sending one or more commands pertaining to the natural disaster to one or more third parties.

In another aspect, the present disclosure is directed to a disaster detection system, comprising: a device processor; and a non-transitory computer readable medium including instructions executable by the device processor to perform the following steps: receiving data from a plurality of geographically distributed personal electronic devices; determining, based on the data received from the personal electronic devices, that a natural disaster has occurred; and sending one or more commands pertaining to the natural disaster to regulate operation of one or more control systems in a geographic area affected by the natural disaster.

In another aspect, the present disclosure is directed to a criminal act detection system, comprising: a device processor; and a non-transitory computer readable medium including instructions executable by the device processor to perform the following steps: receiving data from a plurality of geographically distributed personal electronic devices; determining, based on the data received from the personal electronic devices, that conduct consistent with a criminal act has occurred; and sending information pertaining to the conduct consistent with a criminal act to one or more of the personal electronic devices.

In another aspect, the present disclosure is directed to a criminal act detection system, comprising: a device processor; and a non-transitory computer readable medium including instructions executable by the device processor to perform the following steps: receiving data from a plurality of geographically distributed personal electronic devices; determining, based on the data received from the personal electronic devices, that conduct consistent with a criminal act has occurred; and sending one or more commands pertaining to the conduct consistent with a criminal act to one or more third parties.

In another aspect, the present disclosure is directed to a criminal act detection system, comprising: a device processor; and a non-transitory computer readable medium including instructions executable by the device processor to perform the following steps: receiving data from a plurality of geographically distributed personal electronic devices; determining, based on the data received from the personal electronic devices, that conduct consistent with a criminal act has occurred; and sending one or more commands pertaining to the conduct consistent with a criminal act to regulate operation of one or more control systems in a geographic area affected by the conduct consistent with a criminal act.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1A:
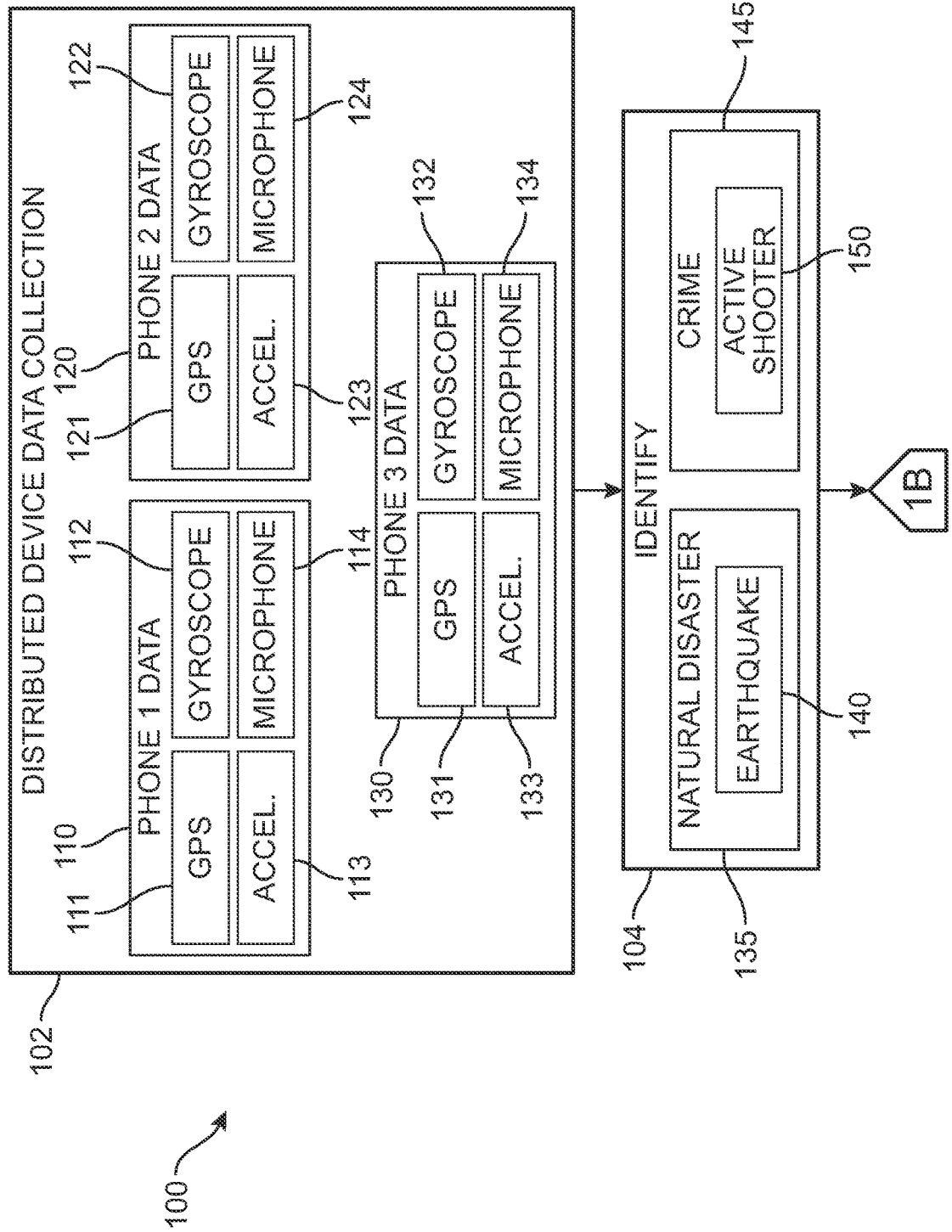
FIGS. 1A and 1B provide a schematic illustration of an event detection system and process.

The present disclosure is directed to an event detection system. The system may utilize sensors commonly incorporated into personal electronic devices to collect data from the surrounding environment. The system may collect such data from a plurality of geographically distributed personal electronic devices. In some embodiments, one or more of the plurality of personal electronic devices may be mobile phones. Mobile phones may be well suited for such data collection, since most people carry mobile phones on their person and keep them turned on (i.e., to receive telephone calls, text messages, emails, and/or other means of communication, such as social media alerts). With the devices turned on, other sensors may be utilized to collect data from the surroundings.

For example, in some embodiments, gyroscopes and/or accelerometers in the devices may be used to detect shaking, for example, from an earthquake. Although personal electronic devices experience shaking and vibrations during everyday use (e.g., from walking or riding in a vehicle), in an earthquake, many phones in proximity to one another will experience the same or similar shaking pattern at the same time. When the same or similar shaking pattern is detected in multiple personal electronic devices at the same time, it can be determined that an earthquake has been detected. From data collected from multiple personal electronic devices, it can be determined the magnitude, epicenter, and affected area (e.g., how far from the epicenter can the shaking be determined as hazardous) of an earthquake. In some cases, slight differences between the times at which the data is recorded may also indicate location, direction, or magnitude of the event. For example, as a shock wave from an earthquake propagates, it will be recorded slightly earlier by users' phones that are closer to the epicenter, and slightly later by users' phones that are further from the epicenter. These differences in timing may be used to determine information about the event.

In some embodiments, the microphone of the personal electronic devices may record ambient noise. Such sound monitoring may be used to detect gunshots. Sound data collected from multiple personal electronic devices may be used to determine the location from which the shots were fired. This may assist authorities in finding an active shooter in a civilian area. This detection system may also be used in a militarized area as well, e.g., to determine the location of a sniper. In a military setting, the personal electronic devices from which data is collected may need to be other than mobile phones, which are not always carried by soldiers. For example, the microphones in soldiers' communications equipment ("comms") may be implemented to collect sound data to triangulate the location of a shooter.

In addition to gyroscope/accelerometer data and/or microphone data, global positioning system (GPS) data from the personal electronic devices may also be collected and included in the analysis to determine the occurrence, location, and magnitude of events.

Figure 1B:
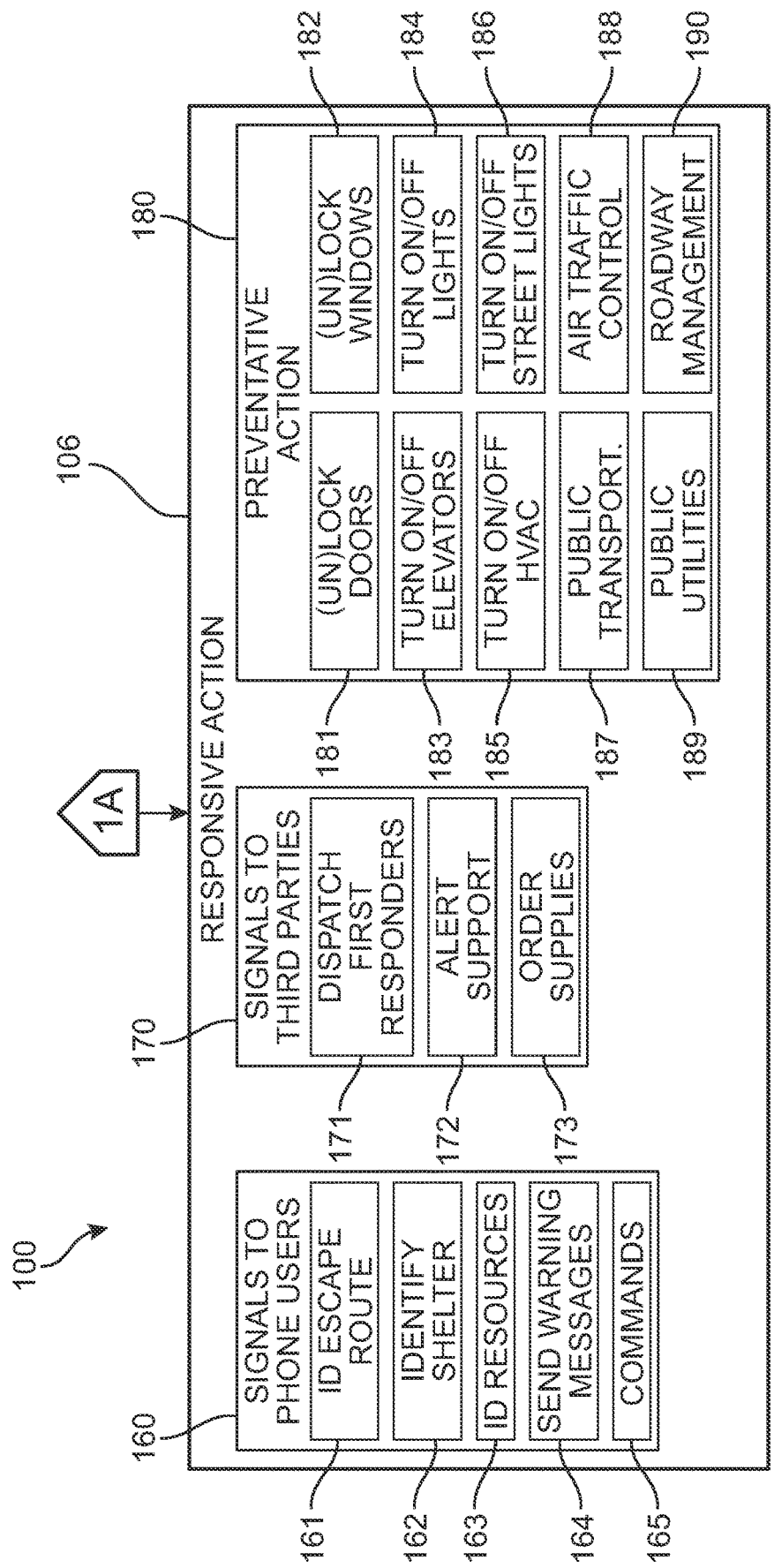

FIGS. 1A and 1B provide a schematic illustration of an event detection system and process. As shown in FIGS. 1A and 1B, an event detection system 100 is illustrated in terms of its functional processes. In some embodiments, system 100 may be a natural disaster detection system. For example, in some embodiments, system 100 may be an earthquake detection system. In some embodiments, system 100 may be a criminal act detection system. For example, in some embodiments, system 100 may be configured to detect gunshots.

As shown in FIG. 1A, a step 102 indicates a process of data collection from a plurality of geographically distributed personal electronic devices. The plurality of personal electronic devices may be any suitable devices having the sensors and data collection capabilities configured to collect the data needed to determine whether the monitored event has occurred. For purposes of this discussion, personal electronic devices shall be considered to encompass handheld devices, such as mobile phones, smart phones, tablets, music players, etc., as well as wearable devices, such as smart watches, fitness trackers, etc.

As shown in FIG. 1A, a plurality of mobile phones may be utilized to collect the data. For example, a first phone 110 may include a plurality of sensors and data collection features including a first GPS system 111, a first gyroscope 112, a first accelerometer 113, and a first microphone 114. A second phone 120 may include a plurality of sensors and data collection features including a second GPS system 121, a second gyroscope 122, a second accelerometer 123, and a second microphone 124. Further, a third phone 130 may include a plurality of sensors and data collection features including a third GPS system 131, a third gyroscope 132, a third accelerometer 123, and a third microphone 134.

Data may be collected by these sensors in a plurality of personal electronic devices. Although three phones are shown for purposes of illustration, it will be understood that system 100 may collect data from many personal electronic devices. In an area where people are gathered, such as a sporting event, theatre, shopping center, etc., data may be collected from hundreds or thousands of personal electronic devices. In a metropolitan area, data may be collected from tens or hundreds of thousands of personal electronic devices. These sensors may each be of the type conventionally provided in smart phones for example.

A step 104 illustrates a process of determining, based on the data received from the personal electronic devices in step 102, that an event has occurred. For example, in some embodiments, step 104 may determine that a natural disaster has occurred (step 135), such as an earthquake (step 140). In some embodiments, step 104 may determine that a criminal act has occurred (step 145), such as gunshots from an active shooter (step 150). The systems disclosed herein may be configured to detect any type of disaster, naturally occurring, or otherwise. For example, detectable disasters may include not only earthquakes, but also other types of natural disasters, such as tornados, hurricanes, forest fires, and/or floods, as well as other types of disasters, such as explosions, chemical leaks, etc. For purposes of explanation, the disclosed disaster detection system will be discussed in the context of an earthquake detection system. Similarly, it will be understood that the disclosed systems may be configured to detect any type of criminal act, including bombings, deployment of biological weapons, deployment of chemical weapons, etc. For purposes of explanation, the disclosed criminal act detection system will be discussed in the context of an active shooter.

In order to make such determinations, the system may include a central controller, which may include a device processor and a non-transitory computer readable medium including instructions executable by the device processor. Features and capabilities of such components are discussed in greater detail below.

Further, as shown in FIG. 1B, a step 106 illustrates a process of taking responsive action based on the determination made in Step 104. In some embodiments, the responsive action may include sending information to one or more personal electronic devices (step 160). For example, step 160 may include sending information pertaining to the natural disaster or criminal act to one or more of the personal electronic devices. In some embodiments, the information may be sent to the personal electronic devices from which data has been collected. In some embodiments, the information may be sent to other personal electronic devices determined to be located in an area potentially affected by the event detected by the system.

In some embodiments, the information pertaining to the detected event may include an identification of an escape route (step 161). For example, system 100 may determine one or more viable escape routes from the location of a personal electronic device to an area that is less (or not) affected by the detected event. The escape route may be selected and directly input into a mapping app on the personal electronic device so that the user of the personal electronic device may follow the navigation instructions of the identified escape route.

In some embodiments, the information pertaining to the detected event may include an identification of shelter for users of the one or more personal electronic devices (step 162). For example, system 100 may identify a shelter, such as a sturdy building, underground facility, or other location of safety that is in the geographic area proximate to the personal electronic device.

In some embodiments, the information pertaining to the detected event may include an identification of resources for users of the one or more personal electronic devices (step 163). For example, system 100 may send messages identifying resources, such as gas stations, grocery stores, banking facilities, and hardware stores, as well as water, electrical power, medical treatment, and other supplies and services provided by disaster support organizations.

In some embodiments, the information pertaining to the detected event may include one or more warning messages for users of the one or more personal electronic devices (step 164). Such warning messages may alert users to an event that has occurred or is ongoing in their area. Such messages may identify the type of event and, to the extent known, the location of the event.

In some embodiments, the information pertaining to the detected event may include one or more commands to operate features of the one or more personal electronic devices (step 165), for example by turning the features on or off.

In some cases, the commands may be to activate various features of the personal electronic devices. For example, in some embodiments, the information may include commands for phones in the area to begin recording data from the phones' microphones or other sensors. In some embodiments, the information may include an instruction for the personal electronic devices to emit a siren or other audible alert. In some cases, the sirens could be used as a panic alarm alerting others to the distress of the device user. In other cases, it could be to warn the user themselves. Further, in some cases, the system may be configured to send instructions to all devices in a locality to emit a high pitched siren. Collectively, multiple devices emitting such a harsh sound may be incapacitating, or at least distracting, to a perpetrator, such as an active shooter. In some embodiments, the information may include instructions for turning on the lights of the phone, such as a flashlight. By turning on the flash light, the user may be able to find their phone in the dark; also, the flash light may light up a dark room. If multiple users have the same or similar functions operated, the whole room could be lit up by the phones' flashlights. Also, the collection of lights could be used to blind a would be assailant.

In some embodiments, the information may include commands to deactivate various features of the personal electronic devices. For example, in some cases, the information may include instructions to silence one or more sound emitting functions of the phones. Additionally, or alternatively, the information may include commands to turn off the phones' lights and screens. Turning off such features may conserve battery life of the phones. In addition, by turning off audible and visual features of the phones, it may assist users to avoid detection by an active shooter.

In some embodiments, the responsive action taken may include sending one or more commands pertaining to the natural disaster or criminal act to one or more third parties (step 170).

In some embodiments, system 100 may be configured to send one or more commands pertaining to the natural disaster or criminal act, including instructions to dispatch first responders to a location affected by the natural disaster or criminal act (step 171). For example, system 100 may be configured to send instructions for the dispatch of police, firefighters, medical providers, etc.

In some embodiments, the one or more commands pertaining to the natural disaster or criminal act may include one or more alerts to one or more organizations that provide support for natural disasters (step 172). For example, such alerts may include notifications to support organizations, such as the Federal Emergency Management Agency (FEMA), the American Red Cross, and various other organizations that provide aid in the event of emergency situations.

In some embodiments, the one or more commands pertaining to the natural disaster or criminal act may include one or more orders of disaster recovery supplies (step 173). For example, system 100 may be configured to send orders for supplies, such as water, blankets, electrical power, and other supplies and services.

In some embodiments, action taken in response to detection of a disaster or criminal act may be preventative action taken in order to prevent further harm by the disaster or criminal (step 180). For example, in some embodiments, the responsive action taken may include sending one or more commands pertaining to the natural disaster or criminal act to regulate operation of one or more control systems in a geographic area affected by the natural disaster.

In some embodiments, the one or more commands pertaining to the natural disaster or criminal act include instructions for regulating operation of one or more building systems. For example, the one or more building systems may include at least one of door locks 181, window locks 182; elevators 183; lights 184; and heating, ventilation, and air conditioning (HVAC) 185. Other such building systems may include security systems, electricity, video systems, audio systems, Wi-Fi, etc. Such control of building systems may be executed via the Internet of Things (IoT). That is, those systems may be networked, and thus controllable via an Internet connection.

These building systems may be controlled to assist people in and around the buildings that house them. For example, in some cases, door locks may be unlocked to allow people to enter safer areas, such as a basement area. In other cases, door locks may be locked in order to prevent an active shooter from entering an area of the building in which people are located. Similarly, lights, window locks, elevators, and HVAC systems may be turned on or off depending on what would be most beneficial to the occupants of the building or others who may take refuge in the building during or after a natural disaster or criminal act.

In some embodiments, the one or more commands pertaining to the natural disaster or criminal act may include instructions for regulating operation of one or more transportation systems. For example, such transportation systems may include at least one of traffic lights 186, public transportation 187, air traffic control 188, and roadway management 190. In some embodiments, the one or more commands pertaining to the natural disaster or criminal act include instructions for regulating operation of one or more public utilities 189. As with the building systems, the operation of the transportation systems and/or public utilities may be regulated to benefit the people in the area affected by the natural disaster or criminal act. For example, it may be beneficial to change a section of highway system so that both northbound and southbound lanes are used for southbound traffic in order to facilitate an evacuation away from a natural disaster located to the north of the section of highway in question. In some cases, it may be beneficial to shut down all public transportation, in order to limit the ability of a criminal to escape and evade capture by the police. In other cases, it may be beneficial to dispatch more buses than usual in order to facilitate an evacuation in the event of a natural disaster.

Figure 2:
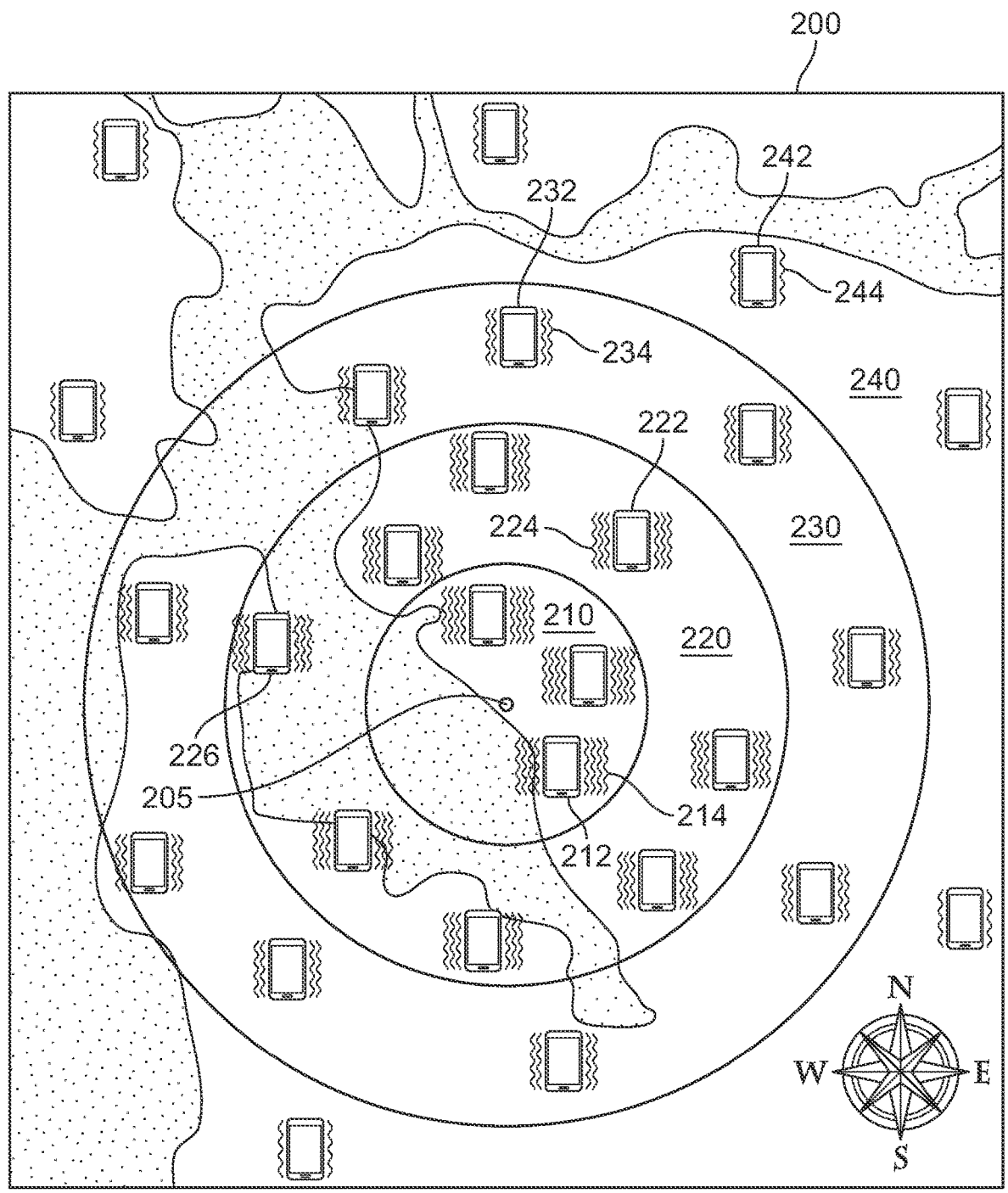
FIG. 2 is a schematic illustration of a map showing distributed personal electronic devices registering vibrations of an earthquake.

FIG. 2 is a schematic illustration of a map showing geographically distributed personal electronic devices registering vibrations of an earthquake. As shown in FIG. 2, a map 200 illustrates a plurality of mobile phones distributed about a geographic area. The detection of vibrations by the phones is illustrated schematically. FIG. 2 illustrates an epicenter 205. Surrounding epicenter 205 are concentric rings indicating radial distance from epicenter 205. For example, a first region 210 is centrally located and includes epicenter 205. A second region 220 is concentrically disposed about first region 210. A third region 230 is concentrically disposed about second region 220. In addition, a fourth region 240 is concentrically disposed about third region 230.

The effects of the earthquake generally diminish with distance from epicenter 205. Accordingly, mobile devices disposed closer to epicenter 205 may detect more severe vibrations than mobile devices that are disposed further away from epicenter 205. As shown in FIG. 2, a first phone 212 is disposed within first region 210. Four wavy lines 214 are shown on either side of first phone 212 as well as about other phones within first region 210. These four wavy lines 214 schematically illustrate the severity of the shaking that first phone 212 experiences as a result of the earthquake.

A second phone 222 is disposed within second region 220. Three wavy lines 224 are shown in both sides of second phone 222 (and other phones within second region 220). These three wavy lines 224, by having fewer lines, illustrate less severe vibration experienced by second phone 222 as compared to first phone 212. Similarly, a third phone 232 is disposed within third region 230. Two wavy lines 234 are shown on both sides of third phone 232 (and other phones within third region 230) to illustrate less severe vibration experienced by third phone 232 as compared to that experienced by second phone 222. Also, a fourth phone 242 is disposed within fourth region 240. A single wavy line is shown on both sides of fourth phone 242 (and other phones within fourth region 240) to illustrate less severe vibration experienced by fourth phone 242 as compared to third phone 232.

It will be noted that, for purposes of illustration and clarity, only 10 or fewer phones are shown in each region of FIG. 2. It will be understood that, in some cases, data may be collected from many more phones (e.g., hundreds or thousands of phones and/or other personal electronic devices) in a given geographic region. It will also be understood that the detection of natural disasters and/or criminal acts discussed herein can be detected based on data from a relatively small number of personal electronic devices.

Figure 3:
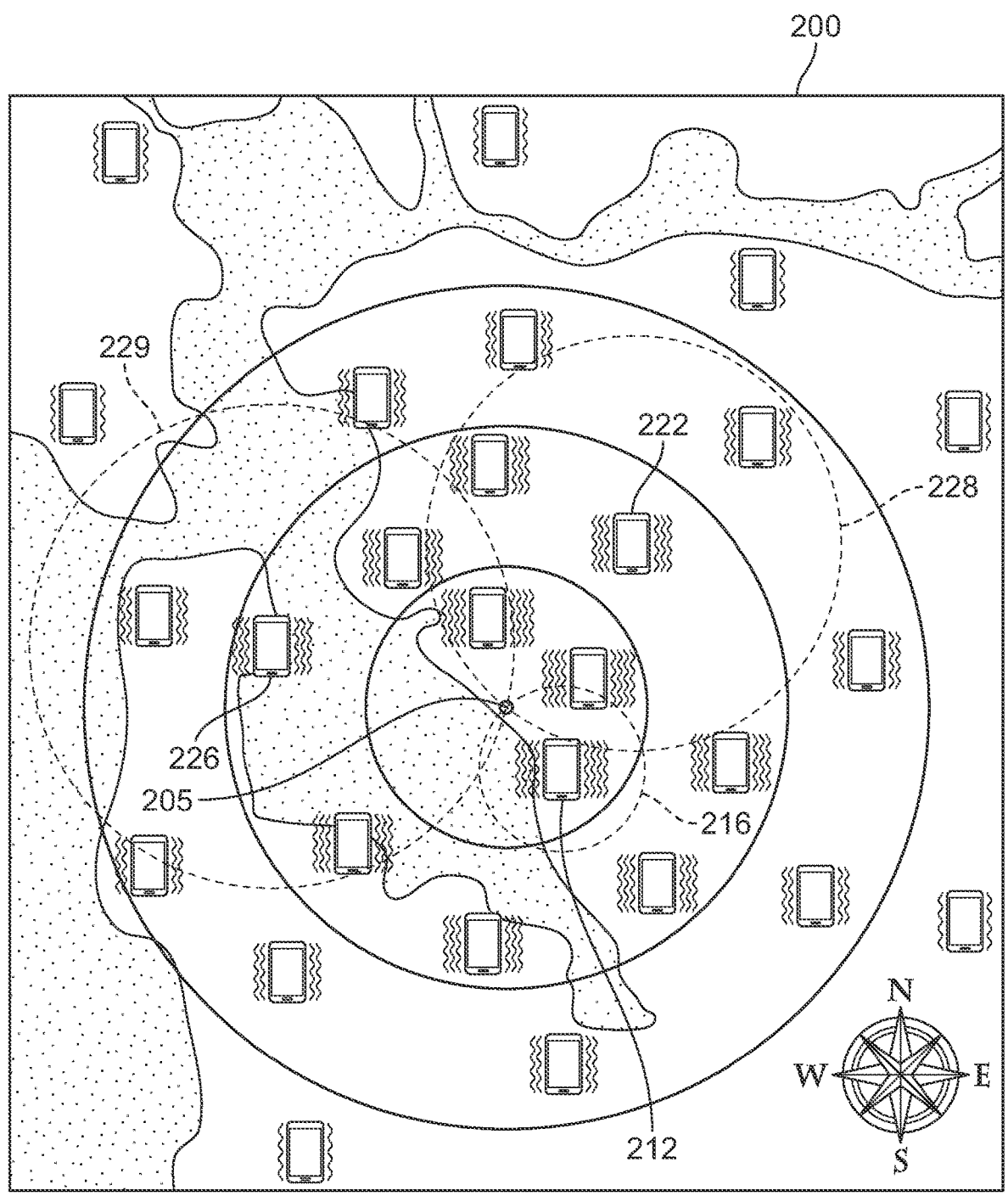
FIG. 3 is a schematic illustration of the map of FIG. 2, showing exemplary determination of the earthquake epicenter.

FIG. 3 is a schematic illustration of the map of FIG. 2, showing exemplary determination of the earthquake epicenter. FIG. 3 schematically illustrates triangulation of the location of earthquake epicenter 205. As shown in FIG. 3, a first dashed circle 216 is drawn about first phone 212, with the radius of first dashed circle 216 being relatively small, indicating an estimation that the epicenter is close to first phone 212, since the vibration is relatively severe compared to other phones from which data is collected. A second dashed circle 228 is drawn about second phone 222, similarly illustrating an estimated distance to the epicenter. A fifth phone 226 is also shown in FIG. 3. A third dashed circle 229 illustrates an estimated distance from fifth phone 226 to the epicenter. The intersection of first dashed circle 216, second dashed circle 228, and third dashed circle 229 can be determined to be epicenter 205. While this triangulation can be performed with as few as three geographically distributed personal electronic devices, an even more precise determination of the location of the epicenter may be determined using data from more than three geographically distributed personal electronic devices. It will be understood that more complex methodologies may be used for determining an earthquake epicenter. Data from multiple sources (e.g., multiple personal electronic devices) may be analyzed and compared to known data patterns consistent with earthquake activity. This may enable the system to decipher between various events that cause shaking. For example, by comparing data patterns, the system may distinguish an earthquake from a volcanic eruption or a bomb explosion. In some embodiments, the data may be combined with data from other sources, such as the Geographic Information System (GIS), United States Geological Survey (USGS), etc., in order to make more accurate determinations and characterizations of earthquake events.

Figure 4:
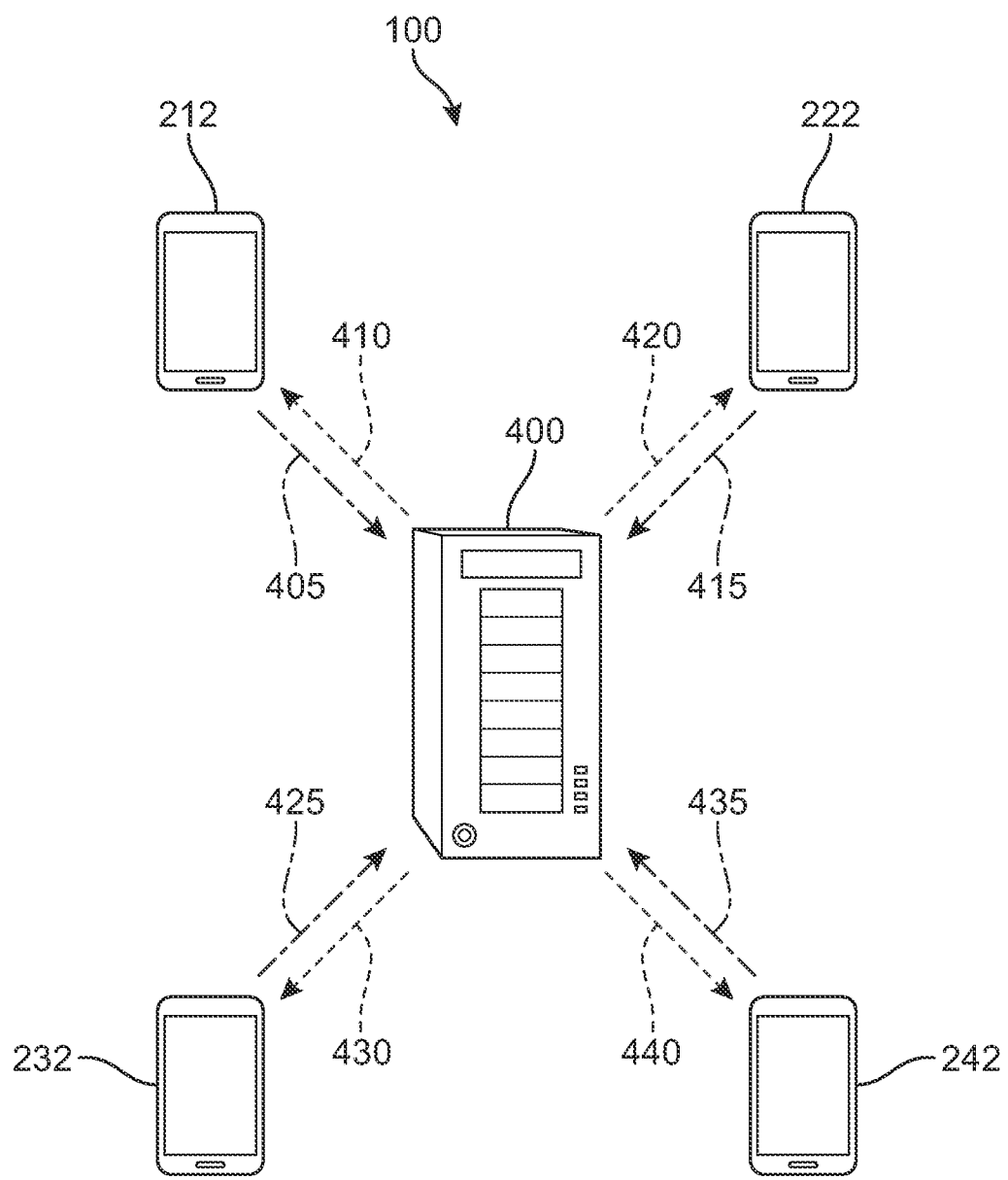
FIG. 4 is a schematic illustration of an event detection system.

FIG. 4 is a schematic illustration of an event detection system. As shown in FIG. 4, event detection system 100 includes a central controller 400. Central controller may include a device processor and a non-transitory computer readable medium including instructions executable by the device processor to perform the processes discussed herein. Controller 400 may be configured to receive data from a plurality of geographically distributed personal electronic devices. From this data, controller 400 may determine that a natural disaster or criminal act has occurred. In addition, controller 400 may be configured to send information, instructions, alerts, commands, or other signals pertaining to the detected event in response to the event being detected.

Controller 400 may include various computing and communications hardware. For example, controller 400 may include a device processor and a non-transitory computer readable medium including instructions executable by the device processor. The computer readable medium may include any suitable computer readable medium, such as a memory, such as RAM, ROM, flash memory, or any other type of memory known in the art. Controller 400 may include other computing hardware, such as servers, integrated circuits, displays, etc.

Further, controller 400 may include networking hardware configured to interface with other nodes of a network, such as a LAN, WLAN, or other networks. For example, controller 400 may include a receiver and a transmitter. (It will be appreciated that, in some embodiments, the receiver and transmitter may be combined in a transceiver.)

As shown in FIG. 4, a first dashed line 405 indicates the receipt of a signal from first phone 212 by controller 400. A second dashed line 410 illustrates information/signals sent by controller 400 to first phone 212. The communication indicated by first dashed line 405 and second dashed line 410 may be via any platform over which first phone 212 is configured to communicate. For example, the information may be delivered via Internet connection, satellite connection, telecommunications protocol, or any other platform usable by first phone 212.

Similarly, a third dashed line 415 indicates the receipt of information by controller 400 from second phone 222, and a fourth dashed line 420 indicates the delivery of information from controller 400 to second phone 222. In some embodiments, the platform of communication between controller 400 and second phone 222 may be the same as, or similar to, the platform of communication between controller 400 and first phone 212. In some embodiments, the platforms of communication may be different from one another.

Further, a fifth dashed line 425 indicates the receipt of information by controller 400 from third phone 232, and a sixth dashed line 430 indicates the delivery of information from controller 400 to third phone 232. In some embodiments, the platform of communication between controller 400 and third phone 232 may be the same as, or similar to, the platform of communication between controller 400 and first phone 212. In some embodiments, the platforms of communication may be different from one another.

Also, a seventh dashed line 435 indicates the receipt of information by controller 400 from fourth phone 242, and an eighth dashed line 440 indicates the delivery of information from controller 400 to fourth phone 242. In some embodiments, the platform of communication between controller 400 and fourth phone 242 may be the same as, or similar to, the platform of communication between controller 400 and first phone 212. In some embodiments, the platforms of communication may be different from one another.

Figure 5:
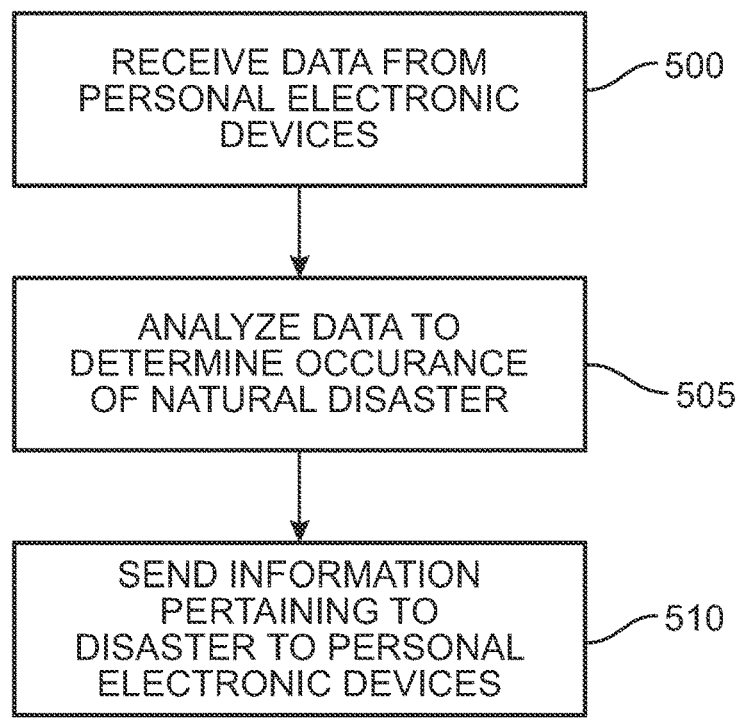
FIG. 5 is a flowchart illustrating a process of determining the occurrence of a natural disaster from data received from personal electronic devices and sending information pertaining to the disaster to the personal electronic devices.

FIG. 5 is a flowchart illustrating a process of determining the occurrence of a natural disaster from data received from personal electronic devices and sending information pertaining to the disaster to the personal electronic devices. As shown in FIG. 5, the computer readable medium may include instructions executable by the processor to receive data from a plurality of personal electronic devices (step 500).

The computer readable medium may further include instructions to determine the occurrence of a natural disaster (step 505). In some embodiments, the system may be configured to detect the occurrence of a natural disaster, such as an earthquake. In such embodiments, the computer readable medium may include instructions for determining location information pertaining to the disaster based on GPS information collected from the plurality of personal electronic devices. For example, in embodiments where the natural disaster is an earthquake, the location information may include the location of the epicenter of the earthquake. In addition, the computer readable medium may further include instructions for determining the magnitude of the earthquake based on the data received from the plurality of geographically distributed personal electronic devices.

As also shown in FIG. 5, the computer readable medium may include instructions to send information pertaining to the detected disaster to one or more personal electronic devices (step 510). As discussed above, the information may include, for example, an escape route for users of the one or more personal electronic devices; an identification of shelter for users of the one or more personal electronic devices; an identification of resources for users of the one or more personal electronic devices; and/or one or more warning messages for users of the one or more personal electronic devices.

Figure 6:
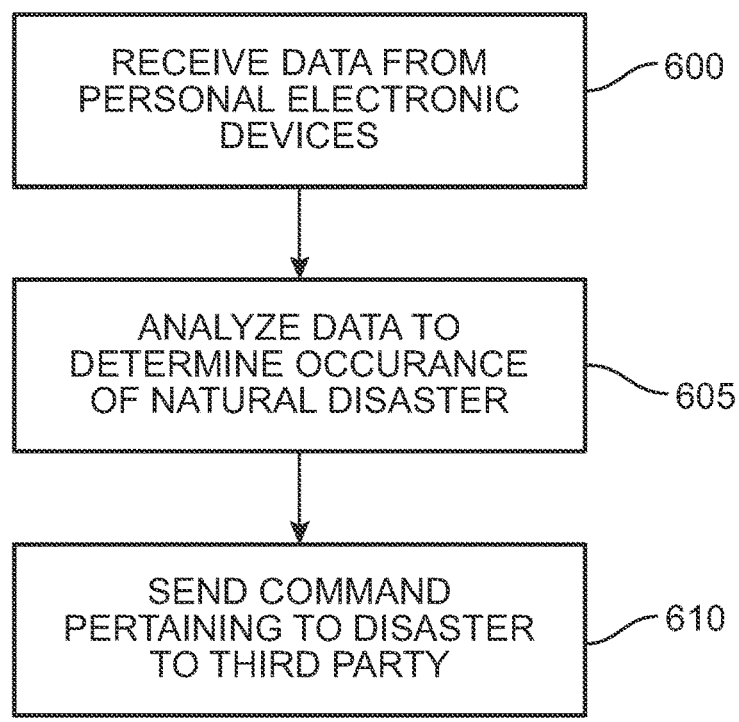
FIG. 6 is a flowchart illustrating a process of determining the occurrence of a natural disaster from data received from personal electronic devices and sending a command pertaining to the disaster to a third party.

FIG. 6 is a flowchart illustrating a process of determining the occurrence of a natural disaster from data received from personal electronic devices and sending a command pertaining to the disaster to a third party. As shown in FIG. 6, the computer readable medium may include instructions executable by the processor to receive data from a plurality of personal electronic devices (step 600). The computer readable medium may further include instructions to determine the occurrence of a natural disaster (step 605), such as an earthquake, as discussed above.

As also shown in FIG. 6, the computer readable medium may include instructions for sending a command pertaining to the natural disaster to a third party (step 610). As discussed above, exemplary commands sent to third parties may include instructions to dispatch first responders, alerts sent to organizations that provide support for emergency relief efforts, and commands for ordering supplies.

Figure 7:
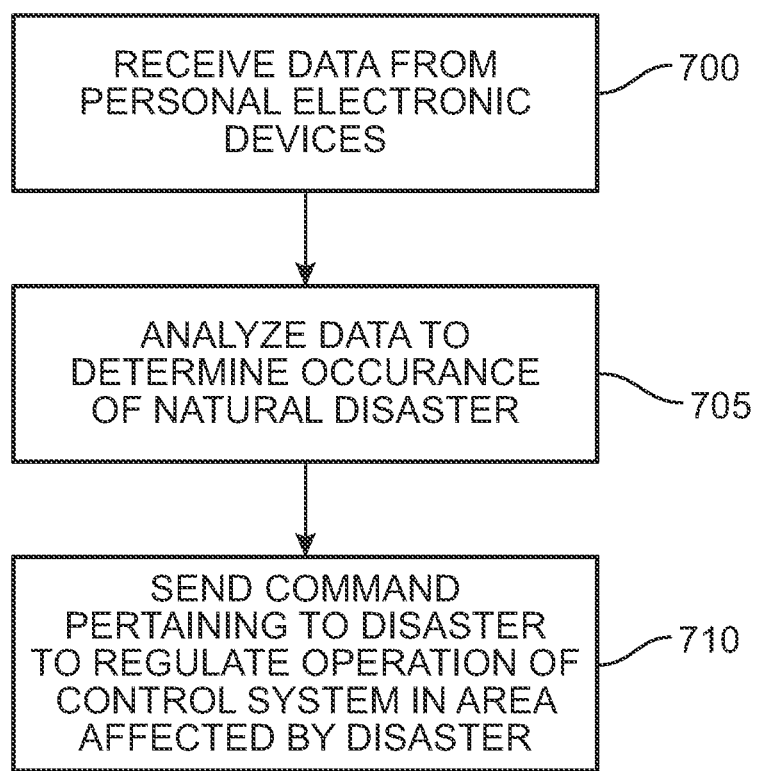
FIG. 7 is a flowchart illustrating a process of determining the occurrence of a natural disaster from data received from personal electronic devices and sending a command pertaining to the disaster to a control system.

FIG. 7 is a flowchart illustrating a process of determining the occurrence of a natural disaster from data received from personal electronic devices and sending a command pertaining to the disaster to one or more control systems in the area of the disaster. As shown in FIG. 7, the computer readable medium may include instructions executable by the processor to receive data from a plurality of personal electronic devices (step 700). The computer readable medium may further include instructions to determine the occurrence of a natural disaster (step 705), such as an earthquake, as discussed above.

As also shown in FIG. 7, the computer readable medium may include instructions for sending a command pertaining to the disaster to regulate operation of a control system in the area affected by the disaster. As discussed above, such commands may include commands for the operation of building systems, transportation systems, and/or public utilities.

In some embodiments, the same information and/or commands may be sent to all devices and parties upon detection of an event. For example, an alert that an earthquake has occurred may be sent with the same content to all devices in a locality deemed to be potentially affected by the earthquake. In some embodiments, different information may be sent to different devices or parties depending on their location with respect to the detected event. For example, a suggested escape route may be sent to devices determined to be a moderate distance from the epicenter of an earthquake. Whereas, for devices determined to be close to the epicenter of an earthquake, there may be too much destruction to provide an escape route, and thus, information may be sent identifying a nearby shelter (e.g., a sturdy and/or earthquake resistant building).

Accordingly, the non-transitory computer readable medium includes instructions for sending different information pertaining to the natural disaster to different personal electronic devices, based on the location information of the natural disaster, depending on the location of each personal electronic device with respect to the natural disaster. Further, the non-transitory computer readable medium may include instructions for sending different commands pertaining to the natural disaster to different control systems, based on the location information of the natural disaster, depending on the location of each control system with respect to the natural disaster.

Figure 8:
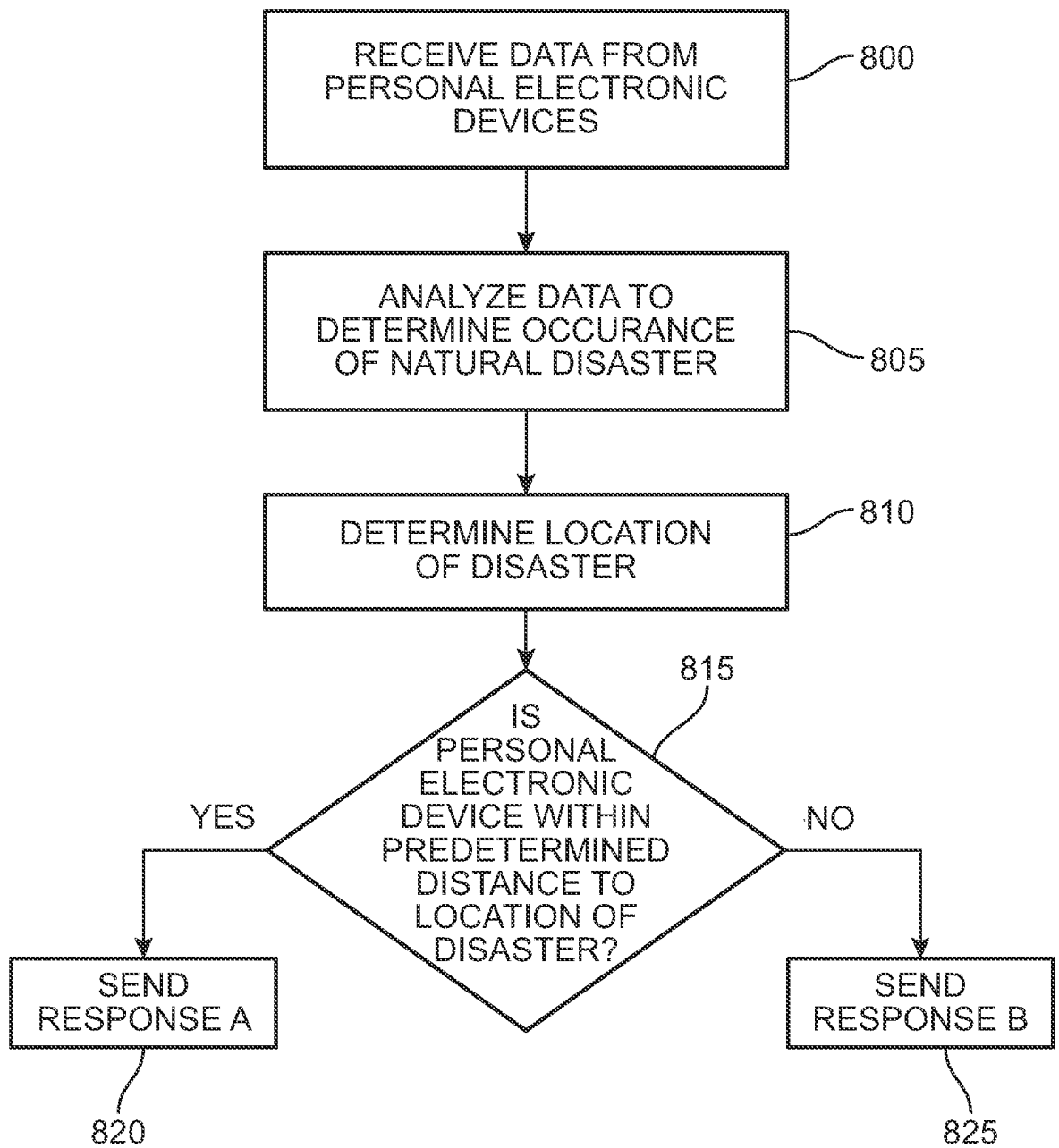
FIG. 8 is a flowchart illustrating a process of determining the occurrence of a natural disaster from data received from personal electronic devices and sending different responses depending on the proximity of the personal electronic devices to the disaster.

FIG. 8 is a flowchart illustrating a process of determining the occurrence of a natural disaster from data received from personal electronic devices and sending different responses depending on the proximity of the personal electronic devices to the disaster. As shown in FIG. 8, the computer readable medium may include instructions executable by the processor to receive data from a plurality of personal electronic devices (step 800). The computer readable medium may further include instructions to determine the occurrence of a natural disaster (step 805), such as an earthquake, as discussed above.

In addition, as also shown in FIG. 8, the computer readable medium may include instructions for determining the location of the disaster (step 810), for example, using GPS data collected from the personal electronic devices. The computer readable medium may include instructions for determining, based on the collected data, whether a personal electronic device is within a predetermined distance to the location of a disaster (step 815). If yes, a first type of response may be sent to personal electronic devices, third parties, or control systems (step 820). If not, a second type of response may be sent to personal electronic devices, third parties, or control systems (step 825).

Figure 9:
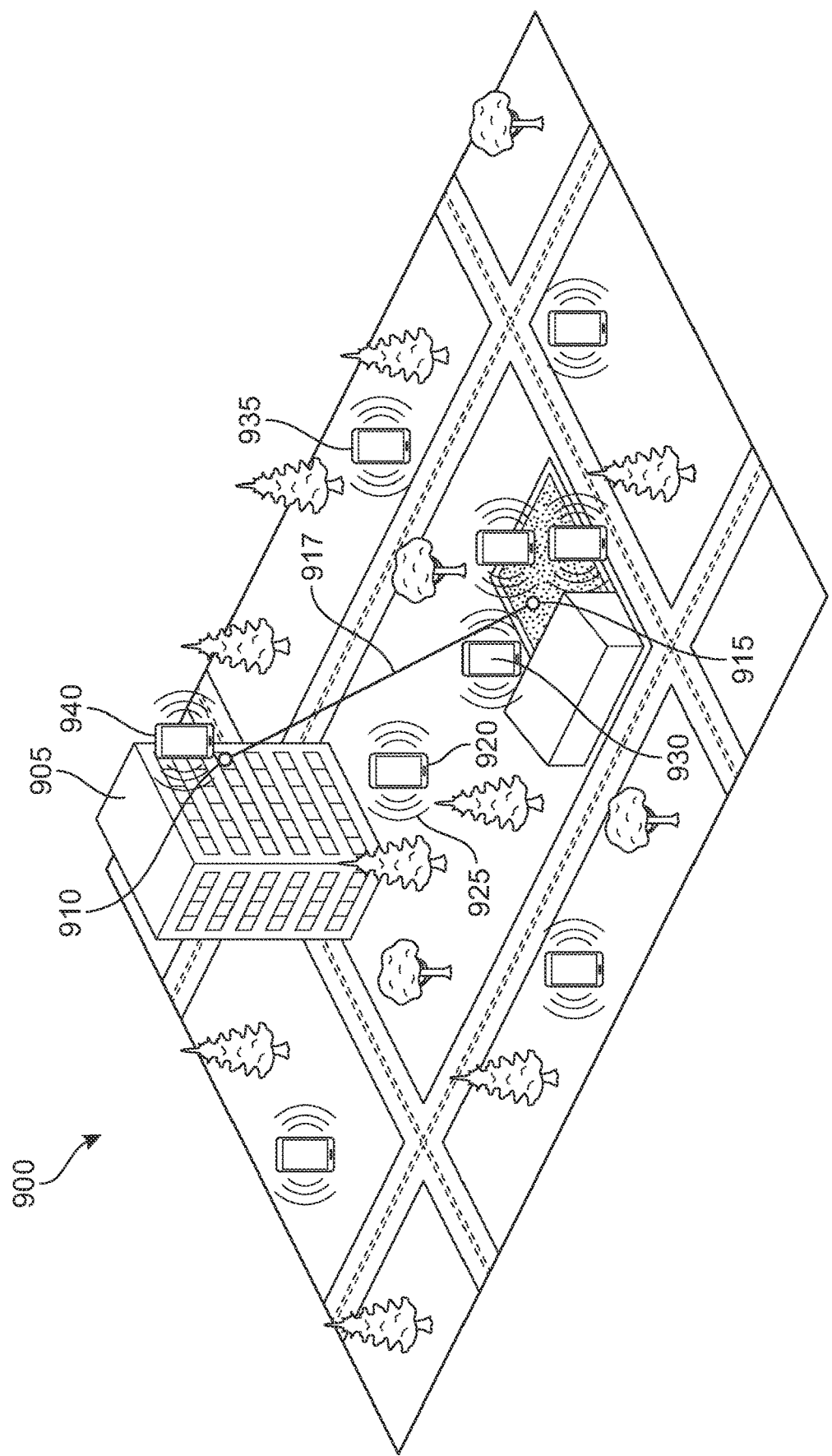
FIG. 9 is a schematic diagram illustrating the detection of an active shooter in a public civilian setting by a plurality of distributed personal electronic devices.

FIG. 9 is a schematic diagram illustrating the detection of an active shooter in a public civilian setting by a plurality of distributed personal electronic devices. As shown in FIG. 9, a schematic diagram 900 may illustrate a criminal act, specifically a shooting in a public area. As shown in FIG. 9, a shooter may fire from a building 905, at a firing location 910. FIG. 9 illustrates a gunshot trajectory 917 from firing location 910 several floors up in a high rise building 905 down to a recreational area 915, such as an audience area for an outdoor theater or concert stage.

As shown in FIG. 9, data can be collected from a plurality of personal electronic devices in the areas surrounding building 905. For example, a first phone 920 closest to the firing location 910 is illustrated with sound waves 925, representing the sound of gunfire received by the microphone of first phone 920. Similarly, the sound of the gunshots may also be recorded by and collected from a second phone 930 and a third phone 935. Further, sound data may also be collected from the shooter's own phone 940.

Figure 10:
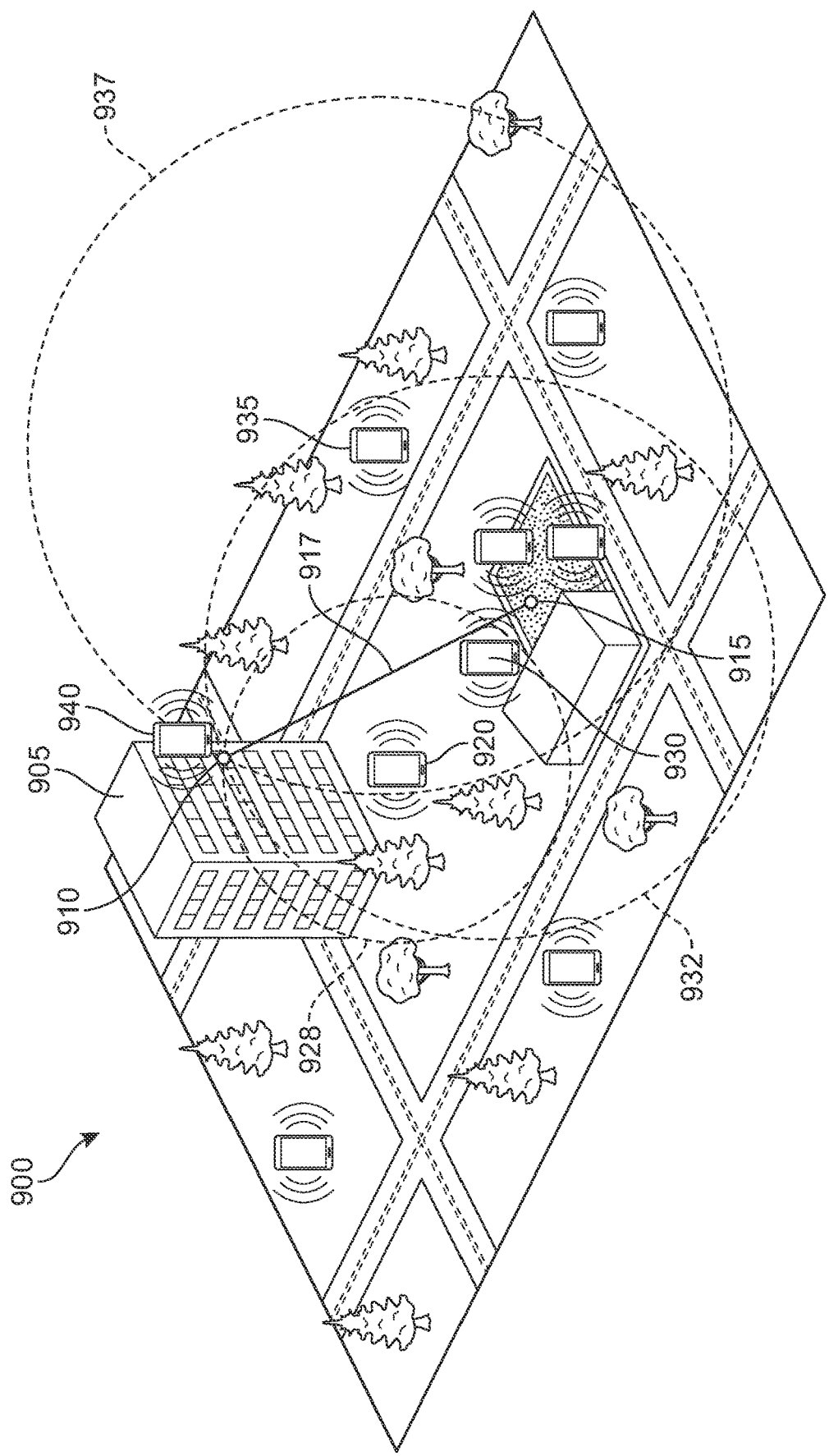
FIG. 10 is a schematic illustration of the diagram of FIG. 9 showing triangulation of the location of the shooter using multiple personal electronic devices.

FIG. 10 is a schematic illustration of the diagram of FIG. 9 showing triangulation of the location of the shooter using multiple personal electronic devices. As shown in FIG. 10, a first dashed circle 928 indicates how far away from first phone 920 the gunshots were fired. Similarly, a second dashed circle 932 indicates the distance of the gunfire from second phone 915. Also, a third dashed circle 937 indicates the distance of the gunfire from third phone 935. The intersection point between first dashed circle 928, second dashed circle 932, and third dashed circle 937 may be determined to be the location from which the gunshots were fired.

In addition, in some embodiments, the location of the shooter may be determined based on a differential volume between two or more gunshots. That is to say that, because people tend to scatter at the sound of gunfire, devices in the line of fire will likely record separate gunshots at a different volume. In contrast, the shooter's own phone will likely record each of the gunshots at substantially the same volume. Accordingly, of all devices from which data is collected, the device that records the gunshots with the smallest differential volume can be determined to be at the location from which the shots were fired. Similarly, the timing at which the gunshots are recorded by each device will vary depending on how close or far the device is from the shooter.

The system may be configured to utilize these differences in timing to determine information about the shooter. Also, the sound signature may be used to determine the type of gun and ammunition used.

Accordingly, in some embodiments, the computer readable medium further includes instructions for determining location information of the location from which multiple gunshots have been fired by comparing a differential between volume levels detected for two gunshots by the plurality of personal electronic devices; and identifying a device with the smallest volume differential as being at, or closest to, the location from which the multiple gunshots were fired.

Figure 11:
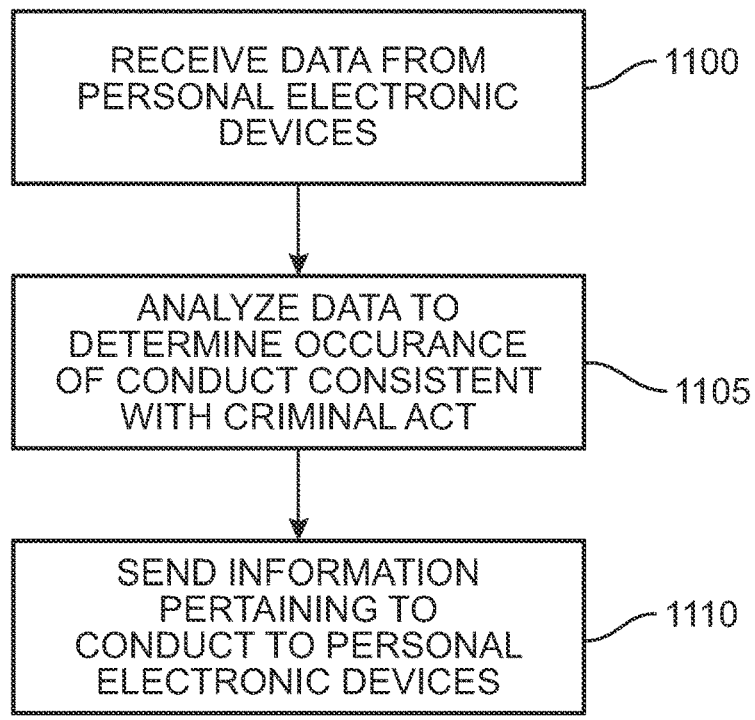
FIG. 11 is a flowchart illustrating a process of determining the occurrence of a criminal act from data received from personal electronic devices and sending information pertaining to the criminal act to the personal electronic devices.

FIG. 11 is a flowchart illustrating a process of determining the occurrence of a criminal act from data received from personal electronic devices and sending information pertaining to the criminal act to the personal electronic devices. As shown in FIG. 11, the computer readable medium may include instructions executable by the processor to receive data from a plurality of personal electronic devices (step 1100). The computer readable medium may further include instructions to determine the occurrence of conduct consistent with a criminal act (step 1105), such as an active shooter, as discussed above.

As also shown in FIG. 11, the computer readable medium may include instructions to send information pertaining to the detected conduct consistent with a criminal act to one or more personal electronic devices (step 1110). As discussed above, the information may include, for example, an escape route for users of the one or more personal electronic devices; an identification of shelter for users of the one or more personal electronic devices; an identification of resources for users of the one or more personal electronic devices; and/or one or more warning messages for users of the one or more personal electronic devices.

Figure 12:
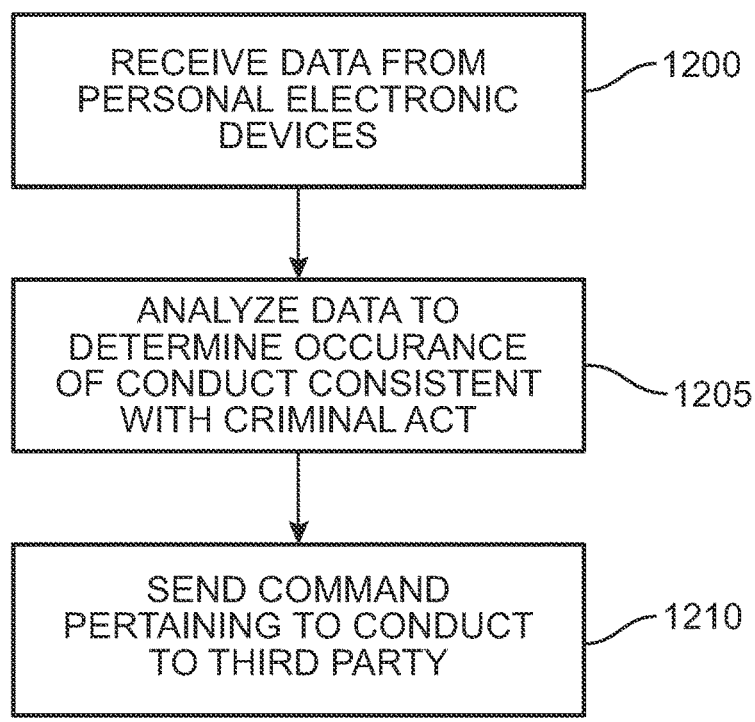
FIG. 12 is a flowchart illustrating a process of determining the occurrence of a criminal act from data received from personal electronic devices and sending a command pertaining to the criminal act to a third party.

FIG. 12 is a flowchart illustrating a process of determining the occurrence of a criminal act from data received from personal electronic devices and sending a command pertaining to the criminal act to a third party. As shown in FIG. 12, the computer readable medium may include instructions executable by the processor to receive data from a plurality of personal electronic devices (step 1200). The computer readable medium may further include instructions to determine the occurrence of conduct consistent with a criminal act (step 1205), such as an active shooter, as discussed above.

As also shown in FIG. 12, the computer readable medium may include instructions for sending a command pertaining to the conduct consistent with a criminal act to a third party (step 1210). As discussed above, exemplary commands sent to third parties may include instructions to dispatch first responders, alerts sent to organizations that provide support for emergency relief efforts, and commands for ordering supplies.

Figure 13:
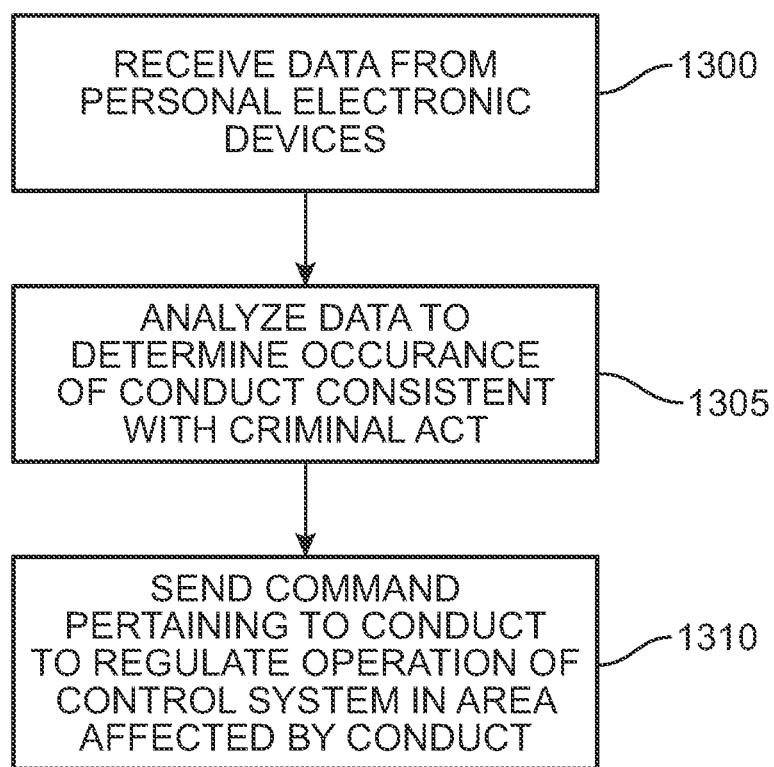
FIG. 13 is a flowchart illustrating a process of determining the occurrence of a criminal act from data received from personal electronic devices and sending a command pertaining to the criminal act to a control system.

FIG. 13 is a flowchart illustrating a process of determining the occurrence of a criminal act from data received from personal electronic devices and sending a command pertaining to the criminal act to the personal electronic devices. As shown in FIG. 13, the computer readable medium may include instructions executable by the processor to receive data from a plurality of personal electronic devices (step 1300). The computer readable medium may further include instructions to determine the occurrence of conduct consistent with a criminal act (step 1305), such as an active shooter, as discussed above.

As also shown in FIG. 13, the computer readable medium may include instructions for sending a command pertaining to the conduct consistent with a criminal act to regulate operation of a control system in the area affected by the disaster. As discussed above, such commands may include commands for the operation of building systems, transportation systems, and/or public utilities.

In some embodiments, the same information and/or commands may be sent to all devices and parties upon detection of an event. For example, an alert that conduct consistent with a crime is ongoing may be sent with the same content to all devices in a locality deemed to be potentially affected by the conduct consistent with a crime. In some embodiments, different information may be sent to different devices or parties depending on their location with respect to the detected event. For example, a suggested escape route may be sent to devices determined to be a moderate distance from an active shooting. Whereas, for devices determined to be close to the shooting, it may be less risky to simply find shelter, and thus, information may be sent identifying a nearby shelter (e.g., a nearby lockable room in a building).

Accordingly, the non-transitory computer readable medium includes instructions for sending different information pertaining to the conduct consistent with a crime to different personal electronic devices, based on the location information of the conduct, depending on the location of each personal electronic device with respect to the conduct. Further, the non-transitory computer readable medium may include instructions for sending different commands pertaining to the conduct consistent with a criminal act to different control systems, based on the location information of the conduct, depending on the location of each control system with respect to the conduct.

Figure 14:
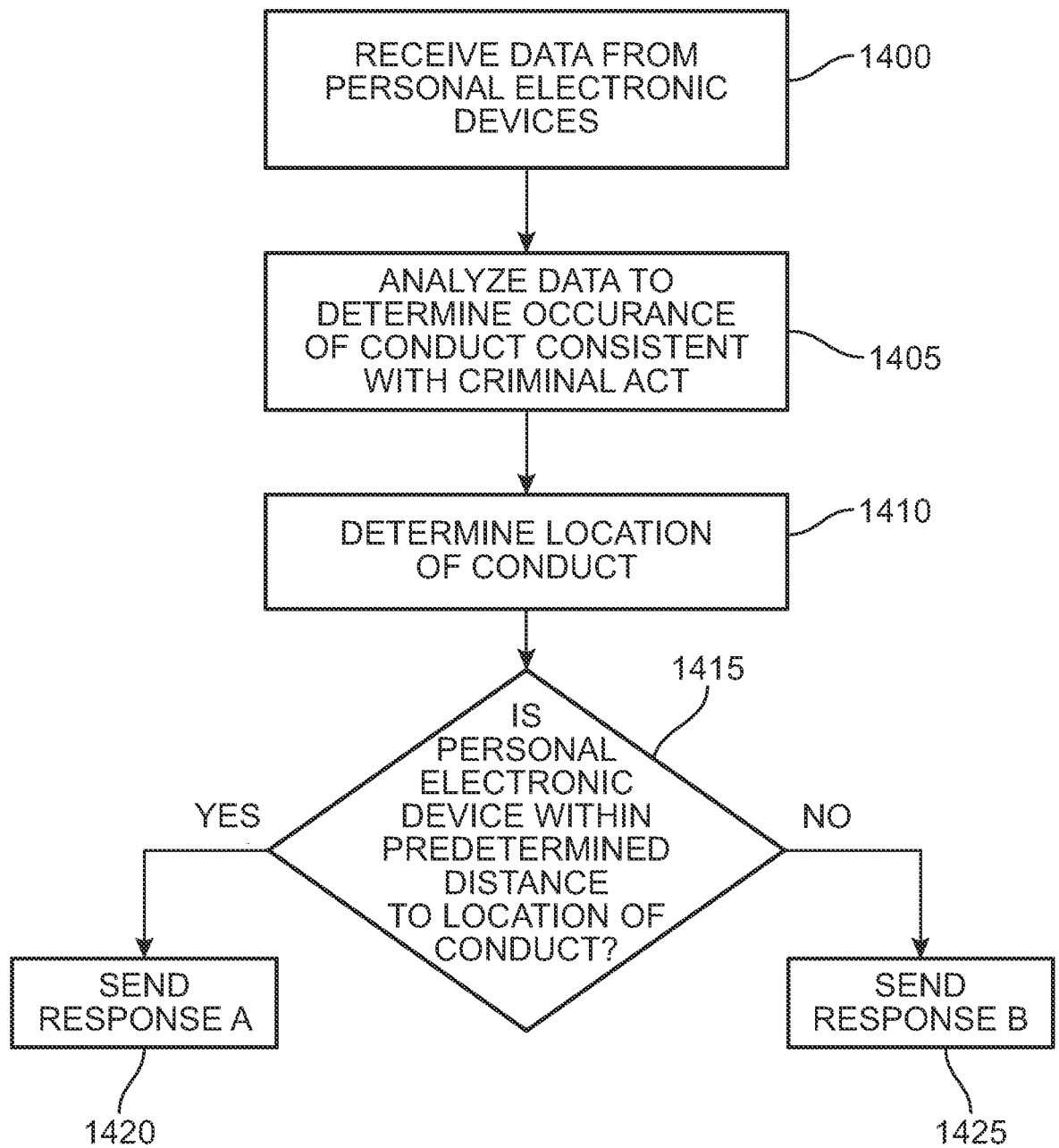
FIG. 14 is a flowchart illustrating a process of determining the occurrence of a criminal act from data received from personal electronic devices and sending different responses depending on the proximity of the personal electronic devices to the location of the criminal act.

FIG. 14 is a flowchart illustrating a process of determining the occurrence of a criminal act from data received from personal electronic devices and sending different responses depending on the proximity of the personal electronic devices to the location of the criminal act. As shown in FIG. 14, the computer readable medium may include instructions executable by the processor to receive data from a plurality of personal electronic devices (step 1400). The computer readable medium may further include instructions to determine the occurrence of a natural disaster (step 1405), such as an earthquake, as discussed above.

In addition, as also shown in FIG. 14, the computer readable medium may include instructions for determining the location of the conduct consistent with a criminal act (step 1410), for example, using GPS data collected from the personal electronic devices. The computer readable medium may include instructions for determining, based on the collected data, whether a personal electronic device is within a predetermined distance to the location of a conduct (step 1415). If yes, a first type of response may be sent to personal electronic devices, third parties, or control systems (step 1420). If not, a second type of response may be sent to personal electronic devices, third parties, or control systems (step 1425).

The embodiments discussed herein may make use of methods and systems in artificial intelligence to improve efficiency and effectiveness of the disclosed systems. As used herein, "artificial intelligence" may include any known methods in machine learning and related fields. As examples, artificial intelligence may include systems and methods used in deep learning and machine vision.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:

1. A disaster detection system, comprising:
a device processor; and
a non-transitory computer readable medium including instructions executable by the device processor to perform the following steps:
receiving data from a plurality of geographically distributed personal electronic devices;
automatically determining, based on the data received from the personal electronic devices, that a disaster has occurred; and
sending one or more commands pertaining to the disaster to one or more third parties;
wherein the one or more commands pertaining to the disaster include one or more alerts to one or more organizations that provide support for disasters.

2. The system of claim 1, wherein the data received from the plurality of personal electronic devices includes gyroscope data.

3. The system of claim 1, wherein the data received from the plurality of personal electronic devices includes accelerometer data.

4. The system of claim 1, wherein the one or more commands pertaining to the disaster include one or more orders of disaster recovery supplies.

5. The system of claim 1, wherein the one or more third parties include an organization of first responders.

6. The system of claim 5, wherein the one or more commands pertaining to the disaster include instructions to dispatch first responders to a location affected by the disaster.

7. A disaster detection system, comprising:
a device processor; and
a non-transitory computer readable medium including instructions executable by the device processor to perform the following steps:
receiving data from a plurality of geographically distributed personal electronic devices;
automatically determining, based on the data received from the personal electronic devices, that a disaster has occurred; and
sending one or more commands pertaining to the disaster to one or more third parties;
wherein the one or more commands pertaining to the disaster include instructions to dispatch first responders to a location affected by the disaster.

8. The system of claim 7, wherein the data received from the plurality of personal electronic devices includes gyroscope data.

9. The system of claim 7, wherein the data received from the plurality of personal electronic devices includes accelerometer data.

10. The system of claim 7, wherein the one or more commands pertaining to the disaster include one or more orders of disaster recovery supplies.

11. The system of claim 7, wherein the one or more commands pertaining to the disaster include instructions for regulating operation of one or more transportation systems.

12. The system of claim 11, wherein the one or more transportation systems include at least one of traffic lights, roadway management, public transportation, and air traffic control.

13. The system of claim 7, wherein the one or more commands pertaining to the disaster include instructions for regulating operation of one or more public utilities.

14. The system of claim 7, wherein the data received from the plurality of personal electronic devices includes global positioning system (GPS) data; and
wherein the non-transitory computer readable medium further includes instructions for determining location information of the disaster based on the GPS data.

15. The system of claim 14, wherein the non-transitory computer readable medium further includes instructions for sending different commands pertaining to the disaster to different control systems, based on the location information of the disaster, depending on the location of each control system with respect to the disaster.

16. A disaster detection system, comprising:
a device processor; and
a non-transitory computer readable medium including instructions executable by the device processor to perform the following steps:
receiving data from a plurality of geographically distributed personal electronic devices;
automatically determining, based on the data received from the personal electronic devices, that a disaster has occurred; and
sending one or more commands pertaining to the disaster to one or more third parties;
wherein the one or more commands pertaining to the disaster include one or more orders of disaster recovery supplies.

17. The system of claim 16, wherein the one or more commands pertaining to the disaster include one or more alerts to one or more organizations that provide support for disasters.

18. The system of claim 16, wherein the disaster is an earthquake and the location information includes the location of the epicenter of the earthquake.

19. The system of claim 16, wherein the data received from the plurality of personal electronic devices includes global positioning system (GPS) data; and
wherein the non-transitory computer readable medium further includes instructions for determining location information of the disaster based on the GPS data.

20. The system of claim 19, wherein the non-transitory computer readable medium further includes instructions for sending different commands pertaining to the disaster to different control systems, based on the location information of the disaster, depending on the location of each control system with respect to the disaster.

* * * * *